United States Patent
Byrd et al.

(10) Patent No.: US 6,914,214 B2
(45) Date of Patent: *Jul. 5, 2005

(54) METHOD OF FORMING A SHAPED HOLE

(75) Inventors: Pamela J Byrd, Coleford (GB); Neil K Hastilow, Bristol (GB); Martin J Stevens, Bristol (GB)

(73) Assignee: Rolls-Royce plc, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 10/878,017

(22) Filed: Jun. 29, 2004

(65) Prior Publication Data

US 2004/0232122 A1 Nov. 25, 2004

Related U.S. Application Data

(63) Continuation of application No. 10/283,146, filed on Oct. 30, 2002, now Pat. No. 6,781,091.

(30) Foreign Application Priority Data

Oct. 30, 2001 (GB) .............................. 0126006

(51) Int. Cl.[7] ............................................. B23K 26/38
(52) U.S. Cl. ............................................. 219/121.71
(58) Field of Search ................... 219/121.7, 121.71; 415/115; 416/97 R, 96 A

(56) References Cited

U.S. PATENT DOCUMENTS

| | | | |
|---|---|---|---|
| 5,609,779 A | 3/1997 | Crow et al. | 219/121.71 |
| 6,307,175 B1 | 10/2001 | Blöchlinger et al. | 219/121.71 |
| 6,362,446 B1 | 3/2002 | Jones et al. | 219/69.17 |
| 6,420,677 B1 | 7/2002 | Emer et al. | 219/121.71 |
| 6,630,645 B2 | 10/2003 | Richter et al. | 219/121.71 |
| 6,744,010 B1 * | 6/2004 | Pepe et al. | 219/121.71 |

FOREIGN PATENT DOCUMENTS

| | | |
|---|---|---|
| EP | 0 365 195 A | 4/1990 |
| GB | 2 227 965 A | 8/1990 |
| WO | WO 99/36221 | 7/1999 |
| WO | WO 02/32614 A1 | 4/2002 |

* cited by examiner

*Primary Examiner*—Geoffrey S. Evans
(74) *Attorney, Agent, or Firm*—Oliff & Berridge, PLC

(57) ABSTRACT

A method of manufacturing a through hole in a component between a first surface and a second surface, the through hole including a cavity formed in the first surface and a communicating passage between the second surface and the cavity including the steps of:
a) laser percussion drilling a plurality of blind holes in the first surface to form the cavity and
b) drilling a communicating passage between the cavity and the second surface.

7 Claims, 5 Drawing Sheets

US 6,914,214 B2

METHOD OF FORMING A SHAPED HOLE

Continuation of U.S. application Ser. No. 10/283,146, filed Oct. 30, 2002, now U.S. Pat. No. 6,781,091.

BACKGROUND OF THE INVENTION

1. Field of Invention

The present invention relates to a method of forming a shaped hole in a component. In particular the present invention relates to the laser drilling of a cooling hole in a component of a gas turbine engine.

2. Description of Related Art

Components in a gas turbine engine are often cooled to survive the high temperatures found therein. One method used is thin film cooling by a supply to air, used as a cooling fluid, is provided to a passage within the component, exiting via cooling holes to form a thin film over the external surface of the component. In addition to removing heat from the component by conduction, the thin film of cooling air serves to prevent hot gas within the gas turbine engine impinging upon the component.

The cooling air used for thin film cooling must be supplied at a pressure greater than the gas path pressure in which the component is operating. This requires work to be carried out on the cooling air, representing a loss of useful power from the engine. In order to minimise the work required and hence maximise the efficiency of the engine, the cooling holes are shaped to optimise the use of cooling air. The shape most commonly used is a 2D diverging hole exiting at low incidence to the surface of the component to be cooled. This "fan" shaped hole allows the cooling film to form more readily than would a conventional constant-bore hole.

At present, such cooling holes are manufactured using EDM spark erosion. This places the component and an electrode in a dielectric such as kerosene or de-ionised water. When a voltage is applied across a small gap between the electrode and the component, material is spark eroded from both. By advancing the electrode into the component a hole is formed. Furthermore, by moving the feed axis of the electrode relative to the component, different shapes can be produced.

SUMMARY OF THE INVENTION

However, the EDM process has weaknesses. Electrodes tend to bend or skid when used at very shallow angles to the surface. When combined with other problems, such as arcing or damaged electrodes, the repeatability of the process can be poor leading to high levels of scrap. Other problems include lack of flexibility, due to the need for bespoke tooling for each component configuration and a slow process time.

Rolls-Royce's European Patent Application No 89310322.6 describes a laser drilling apparatus for drilling shaped holes in a workpiece. However the holes produced by the apparatus are novel in geometry. The present invention provides the ability to laser drill cooling holes that closely approximate "conventional" cooling holes. This is advantageous as the technology can be used to manufacture existing engine components without necessitating redesign.

According to the present invention there is provided a method of forming a through hole in a component between a first surface and a second surface thereof, the through hole comprising a cavity formed in the first surface and a communicating passage between the cavity and the second surface comprising the steps of:

laser percussion drilling a plurality of blind holes in the first surface to form the cavity, then forming the communicating passage between the cavity and the second surface.

BRIEF DESCRIPTION OF THE DRAWINGS

The invention and apparatus for carrying it out will now be described in more detail with reference to the accompanying drawings in which.

DETAILED DESCRIPTION OF EXEMPLARY EMBODIMENTS

Figure 1:
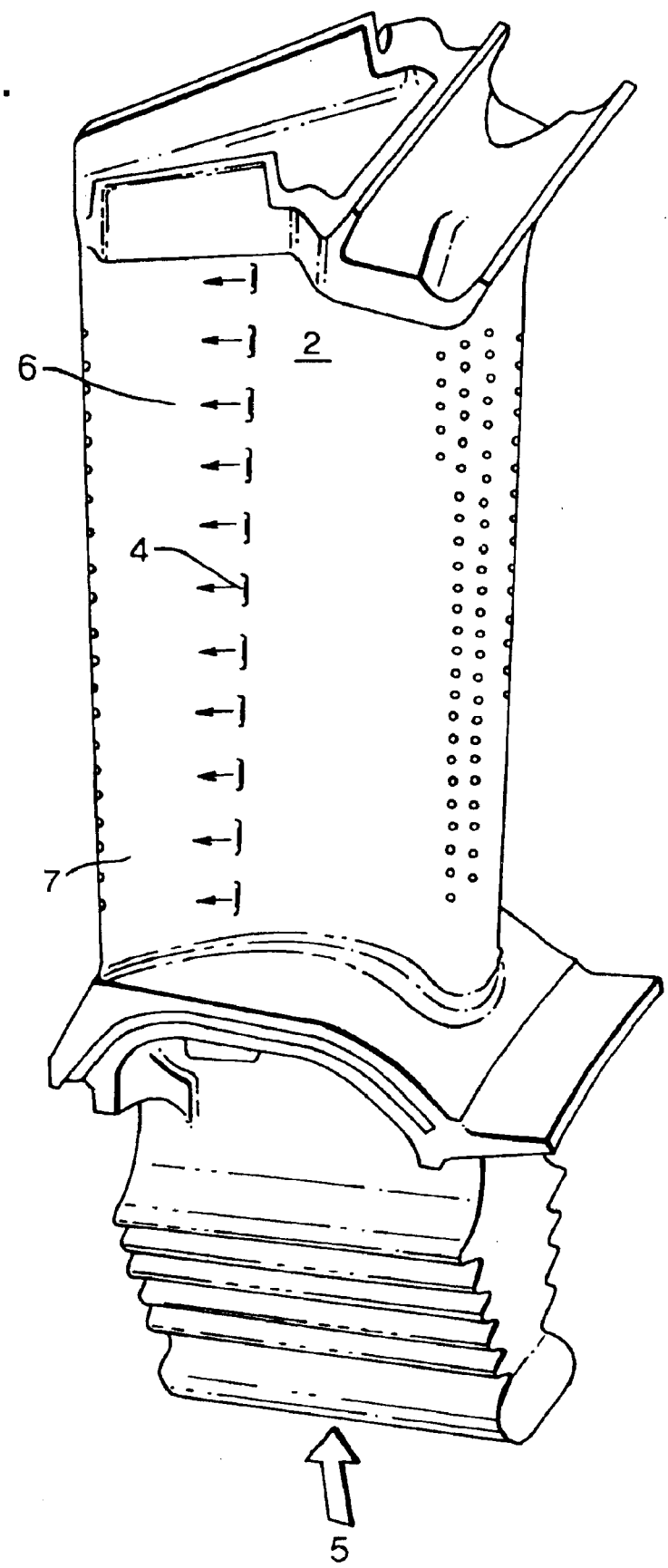
FIG. 1 shows a gas turbine engine component.

Referring now to FIG. 1 a gas turbine component 2 is shown. The component 2 is a nozzle guide vane used in a gas turbine engine, located in the hot gas path immediately downstream of the engine combustor (not shown). In order to operate in such a hostile environment the component 2 is provided with a number of thin film cooling holes 4. Cooling air 5, provided to an internal passage of the component exits through the cooling holes to form a thin cooling film 6 over an external first surface 7 of the component.

Figure 2:
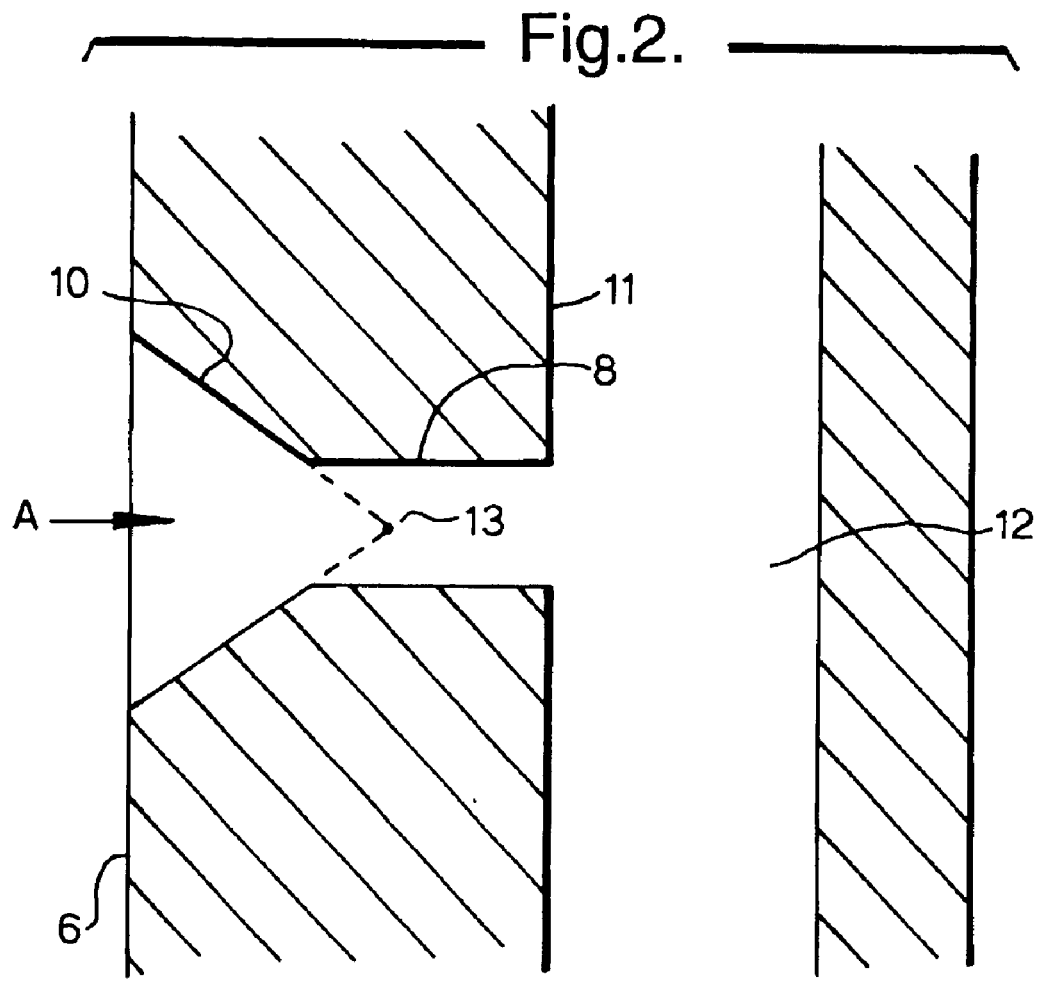
FIG. 2 shows a cross-section through the component illustrating the geometry of a cooling hole.

Referring now to FIG. 2 a cross section of a film cooling hole 4 is shown to illustrate the general construction of such a feature. The cooling hole 4 comprises a communicating passage 8 and a fan shaped cavity 10. The communicating passage 8, typically of constant bore, provides communication between an internal second surface II, bounding an internal passage 12 of the component, and the fan shaped cavity 10. The passage 8 is also called a controlling hole as it meters the flow of cooling air 5. The fan shaped cavity 10 diverges from a point 13 located within the bore of the controlling passage 8 hole until it meets the external surface of the component 2. The fan shaped cavity 10 is so shaped to encourage cooling air emerging from it to fan out, thus forming an effective cooling film 6.

Figure 3:
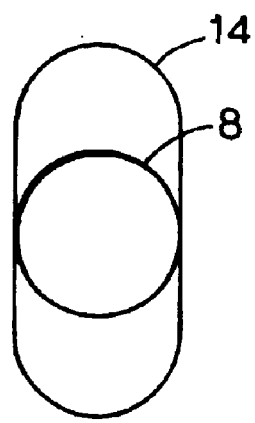
FIG. 3 shows a view on A of FIG. 2 illustrating the structure of a cooling, FIG. 4(a,b,c) illustrate the conventional laser percussions drilling process for forming a through hole in a component.

FIG. 3 shows a view along the bore of the cooling hole 4 to provide further illustration of the cavity 10 geometry. The communicating passage 8 has a round bore. The fan shaped cavity 10 diverges from this bore such that a lozenge shaped exit aperture 14 is formed where the cavity 10 intersects the external surface 7 of the component 2.

At present, cooling holes 4 are manufactured using EDM spark erosion. The present invention proposes the formation of the cooling hole by laser drilling, in particular the use of laser percussion drilling to form the fan shaped cavity 10.

Referring now to FIG. 4 the process of conventional laser percussion drilling is illustrated.

Figure 4A:
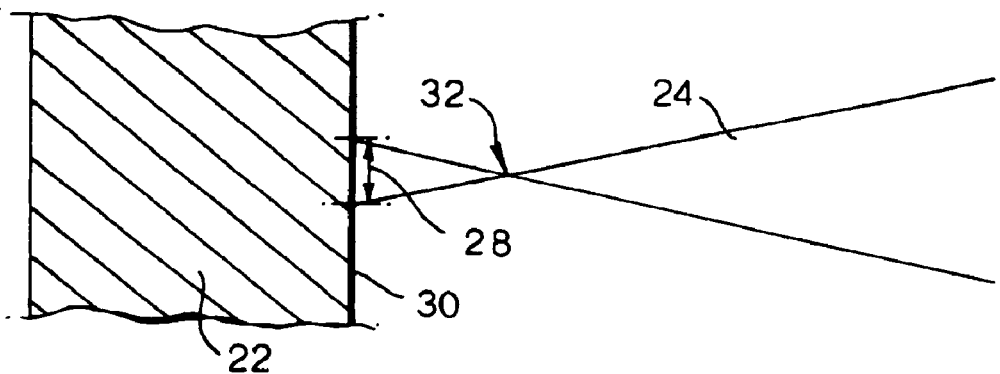
Figure 4B:
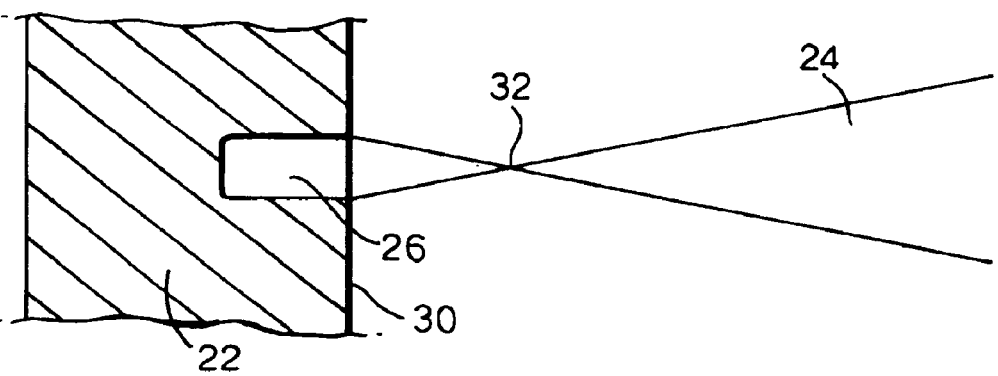
Figure 4C:
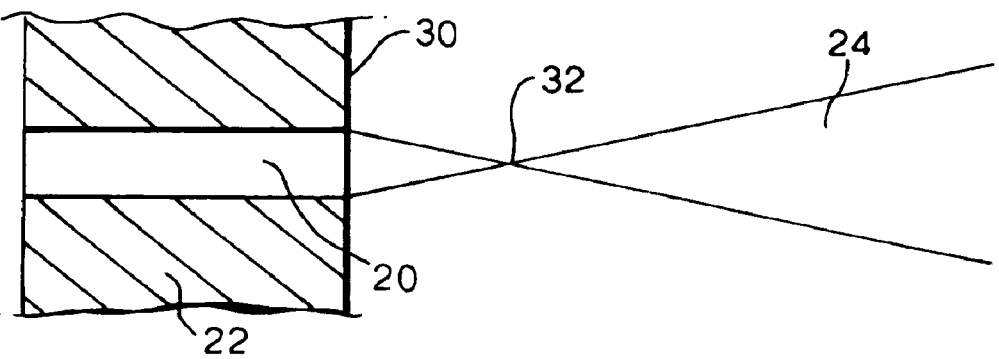

Conventionally, laser percussion drilling is used to form a through hole 20 in a component 22. First, as shown in FIG. 4a, a pulsed laser beam 24 is directed at the component 22. As shown in FIG. 4b the energy of the beam ablates material from the component 22 such that a hole 26 is formed which becomes progressively deeper with each pulse. Such pulses are typically arranged in a pattern, which is repeated until the through hole 20 shown in FIG. 4c is formed. The duration of the pulses, the pauses between pulses and the pauses between patterns are controlled to ensure the optimum conditions for drilling.

The diameter 28 of the hole 20 is controlled by defocusing the laser beam 24 to control the area of the component 22 struck by the coherent radiation of the laser 24. As the hole forms, the laser beam 38 is channelled by the hole 20 itself, which prevents the laser beam 24 from diffusing. This is beneficial as the it allows the same diameter to be maintained throughout the length of the hole without having to alter the position of the focus 32, however, this channelling effect dissipates energy and percussion drilled holes tend to taper inwards, an effect more pronounced with deeper holes.

Conventionally, laser percussion drilling is used to form through holes. Turning now to FIG. 5, the present invention utilises laser percussion drilling to form a number of blind holes, 34,36. By controlling the energy of the laser pulses and controlling the number of pulses delivered the holes are drilled to a predetermined depth.

Figure 5A:
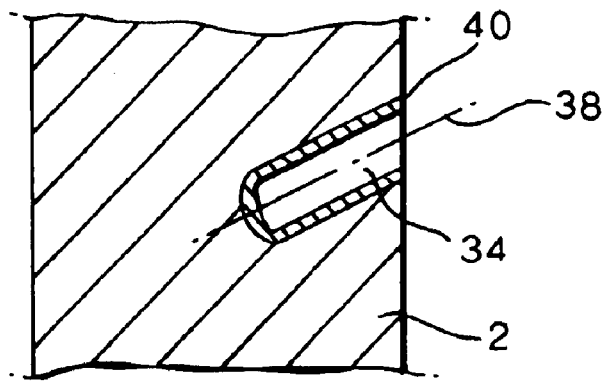
FIG. 5(a,b,c) illustrate the method for forming the cooling hole according to the present invention, and FIG. 6(a,b) show a cooling hole produced by EDM and the same cooling hole produced according to the present invention.

First as shown in FIG. 5a a first blind hole 34 is laser percussion drilled. Orienting the axis 38 of the laser beam relative to the component 2 controls the orientation of this hole relative to the component 2.

Figure 5B:
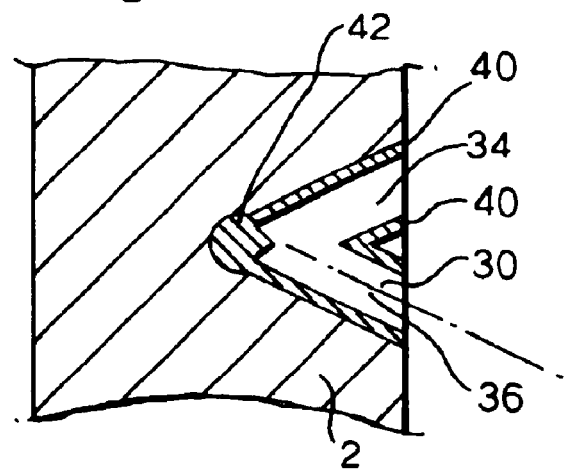

In a following step, as shown in FIG. 5b a second blind hole 36 is drilled. The second blind hole is drilled coplanar with the first blind hole 34, oriented such that the holes intersect at a predetermined point 42. Where the blind holes 34,36 intersect one another, the channelling effect, described above, is lost. Hence care must be taken with the orientation of the component relative to the laser to ensure that the required hole is formed.

Figure 5C:
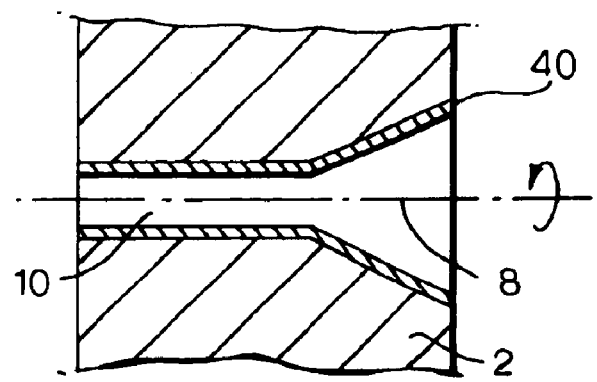

FIG. 5c shows a further step wherein the communicating passage 8 is formed. The component 2 is correctly oriented relative to the laser beam and the laser is used to trepan the controlling hole passage. First, a through "pilot" hole is drilled at the centre of the communicating passage. Then, the laser beam orbited relative to the component 2, thereby trepanning a hole through the component. The diameter of the orbit corresponds to the diameter of the controlling hole 8.

Shown in FIGS. 5a and 5b the laser percussion drilling forms a recast layer 40 about the holes 34,36. This recast layer 40 has reduced material properties when compared with the parent metal. It is therefore important to minimise the thickness of the recast layer 40. By forming the fan shaped cavity 8 from a number of intersecting blind holes 34,36 the thickest region of recast 40 are concentrated at the intersection point 42 of the blind holes 34,36 which is subsequently removed when the communication passage 8 is drilled between the fan-shaped cavity 8 and the second surface 9.

Figure 6A:
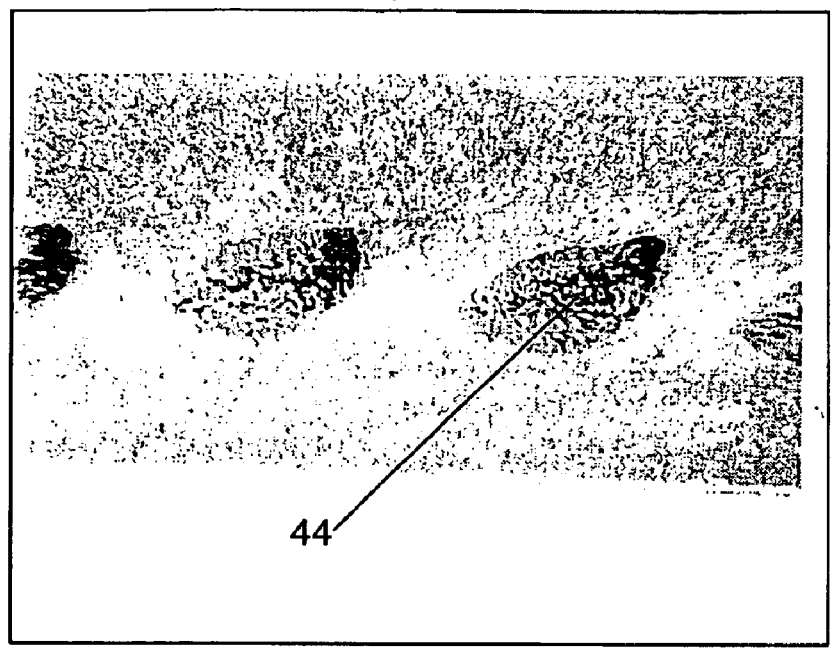
Figure 6B:
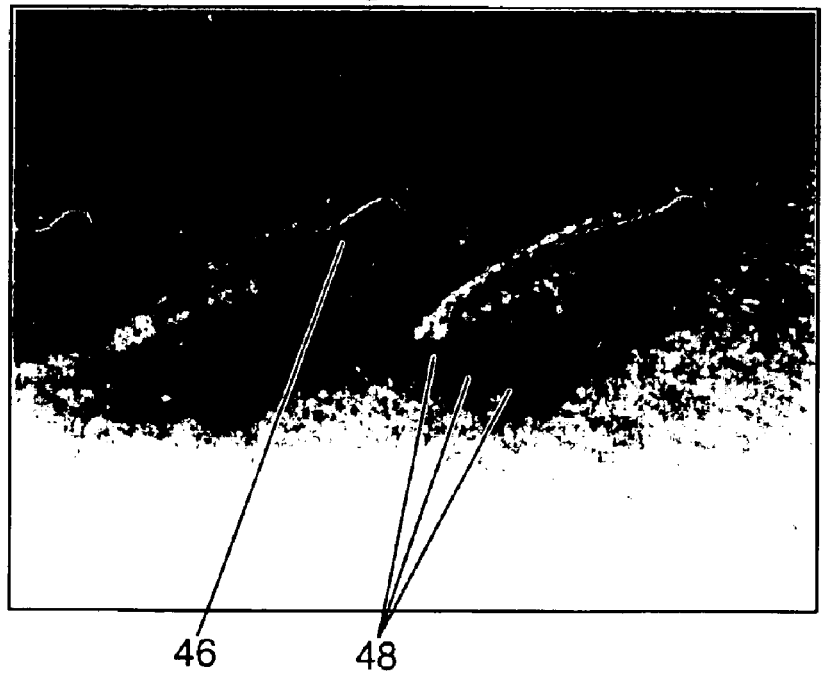

For comparison, FIG. 6a shows a cooling hole 44 produced by conventional EDM and FIG. 6b shows a fan shaped hole 46 created according to the present invention. Though the holes meet the same design specification, the laser drilled cooling hole 46 can be seen to comprise distinctive "flutes" 48 marking the individual blind holes used to form the fan. These have beneficial effects, promoting laminar flow in the airflow exiting the hole.

The hole forming process described above is a relatively simple cooling hole. It will be understood that this is not limiting. For example where a more complex geometry hole is required a greater number of blind holes would be laser percussion drilled to form the cavity.

Similarly the communicating passage does not need to be laser trepanned. Instead the hole cold be laser percussion drilled, formed via electro discharge machining or drilled by conventional chip machining.

What is claimed is:

1. A method of forming a through hole in a component between a first surface and a second surface thereof, the through hole including a cavity formed in the first surface and a communicating passage between the cavity and the second surface, comprising:

laser percussion drilling a plurality of blind holes in the first surface to form the cavity, then forming the communicating passage between the cavity and the second surface.

2. A method of forming a through hole as claimed in claim 1 wherein the plurality of blind holes intersect.

3. A method of forming a through hole as claimed in claim 1 wherein the plurality of blind holes are coplanar.

4. A method of forming a through hole as claimed in claim 1 wherein the communicating passage is formed by laser drilling.

5. A method of forming a through hole as claimed in claim 1 wherein a common laser drilling system is used to form both the cavity and the communicating passage.

6. A method of forming a through hole as claimed in claim 1 wherein the cavity and communicating passage are drilled from a common direction.

7. A method of forming a through hole in a component of a gas turbine engine according to claim 1.

\* \* \* \* \*